United States Patent [19]
Bailey et al.

[11] Patent Number: 5,437,007
[45] Date of Patent: Jul. 25, 1995

[54] CONTROL SEQUENCER IN AN ICONIC PROGRAMMING SYSTEM

[75] Inventors: Randy L. Bailey, Ft. Collins; Douglas C. Beethe, Windsor; James P. Armentrout, Loveland, all of Colo.

[73] Assignee: Hewlett-Packard Company, Palo Alto, Calif.

[21] Appl. No.: 974,860

[22] Filed: Nov. 10, 1992

[51] Int. Cl.$^6$ .............................................. G06F 3/14
[52] U.S. Cl. ................... 395/159; 395/161; 395/157
[58] Field of Search ............... 395/159, 161, 155, 157, 395/160; 364/578, 188

[56] References Cited

U.S. PATENT DOCUMENTS

| | | | |
|---|---|---|---|
| 4,901,221 | 2/1990 | Kodosky et al. | 364/200 |
| 4,914,568 | 4/1990 | Kodosky et al. | 364/200 |
| 5,208,743 | 5/1993 | Nishikawa | 364/578 X |
| 5,251,159 | 10/1993 | Rowson | 395/157 X |
| 5,253,158 | 10/1993 | Suzuki et al. | 364/578 X |
| 5,261,043 | 11/1993 | Wolber et al. | 395/159 |
| 5,291,587 | 3/1994 | Kodosky et al. | 395/157 X |
| 5,293,476 | 3/1994 | Wolber et al. | 395/159 |
| 5,301,301 | 4/1994 | Kodosky et al. | 395/159 X |
| 5,313,574 | 5/1994 | Beethe | 395/159 |
| 5,313,575 | 5/1994 | Beethe | 395/159 |
| 5,377,318 | 12/1994 | Wolber | 395/159 |

FOREIGN PATENT DOCUMENTS

0508632A2 10/1992 European Pat. Off.
WO91/06050 10/1989 WIPO.

OTHER PUBLICATIONS

Masscomp Product Description, Masscomp, Westford, Massachusetts.
*Programming With Pictures,* Jeff Kodosky and Bob Dye, Computer Language Magazine, Jan. 1989, pp. 61–69.
Labview Product Description, National Instruments Corp., Austin, Texas, 1987.
*An Instrument That Isn't Really,* Michael Santori, IEEE Spectrum, Aug. 1990, pp. 36–39.
*Labview: Laboratory Virtual Instrument Engineering Workbench,* G. Vose and G. Williams, BYTE Magazine, Sep. 1986, pp. 84–92.

Primary Examiner—Raymond J. Bayerl
Assistant Examiner—Crescelle N. dela Torre

[57] ABSTRACT

An iconic programming system that provides a sequencer icon to allow a series of operations to be performed, along with the conditions under which the operations are performed. Each operation performed, called a transaction, can be enabled or disabled, or can be enabled by a function within the process. The results of each transaction can be compared to tolerance limits and alternate subsequent transactions processed based upon whether the transaction results fell within the tolerance limits. The output of each transaction can be logged into a buffer to keep the results for later analysis.

17 Claims, 8 Drawing Sheets

FIG. 8

CONTROL SEQUENCER IN AN ICONIC PROGRAMMING SYSTEM

CROSS REFERENCE TO RELATED APPLICATIONS

This application is related to application Ser. No. 07/483,478 filed Feb. 22, 1990 for PROGRAMMING ESCAPE FROM AN ICONIC SYSTEM of Bailey, Beethe, Wolber, and Williams, now abandoned; application Ser. No. 07/537,550 filed Jun. 13, 1990 for PROCESSING METHOD FOR AN ICONIC PROGRAMMING SYSTEM of Beethe, now U.S. Pat. Nos. 5,313,574; 5,313,574; application Ser. No. 07/661,936 filed Feb. 28, 1991 for LINE PROBE IN AN ICONIC PROGRAMMING SYSTEM of Wolber, now U.S. Pat. No. 5,377,318; application Ser. No. 07/668,286 filed Mar. 12, 1991 for INPUT AND OUTPUT CONSTRAINTS ON DEVICES IN AN ICONIC PROGRAMMING SYSTEM of Wolber and Beethe, now U.S. Pat. No. 5,261,043; application Ser. No. 07/668,285 filed Mar. 12, 1991 for A SYSTEM FOR ENTERING AND MODIFYING VARIABLE NAMES FOR TERMINALS OF ICONS IN AN ICONIC PROGRAMMING SYSTEM of Wolber and Beethe, now U.S. Pat. No. 5,293,476; and application Ser. No. 07/686,861 filed Apr. 12, 1991 for WAIT FOR SERVICE REQUEST IN AN ICONIC PROGRAMMING SYSTEM of Beethe, all assigned to the same entity.

FIELD OF THE INVENTION

This invention relates to computer systems and more particularly to Iconic Programming Systems. Even more particularly, the invention relates to transferring programming control within an iconic programming environment to an icon for sequentially processing a series of transactions.

BACKGROUND OF THE INVENTION

An iconic programming system is a "programming-less" environment where programming is done by connecting graphical images of tools (icons), together with connecting lines, to create an iconic network which represents a software program. The iconic programming system may be used in research and development test environments, or manufacturing environments, where several different electronic instruments are connected to test a system or device, or even a plurality of devices. Programming such a system requires instructions to cause the various instruments to perform desired functions in order to operate as a system.

When an iconic programming system is used, each instrument is represented by a graphical icon, also called a graphical object, and the connections between the instruments are represented by lines between the graphical images. In addition to graphical icons representing instruments in such a system, graphical icons are provided for programming functions, for example looping, IF-THEN statements, etc. By combining instrument and programming icons, a user can create an iconic network involving the programmed operation of several instruments.

Iconic systems are designed to relieve the user of having to program in a traditional programming language to accomplish an operation. Because these systems are designed for a user who is not a professional programmer, they provide only very simple programming functions, such as loops, and do not provide a way for programming a complex operation. Also, because the user of the system is unaware of the specific data types and formats of data being exchanged between the instruments, or other graphical objects within the system, traditional sequential programming is very difficult in prior art iconic systems.

A user of an iconic programming system may have a need to include a more complex program within an iconic network, such as controlling the sequential execution of processes or program segments, for example in the sequencing of tests made to test a product on a production line. Such a program may require programming facilities that are very difficult or cumbersome for an iconic programming environment. When this type of problem arises, as shown below with respect to FIG. 2, it is difficult to create the necessary data flow in prior art iconic systems.

Prior art conventional programming systems using textual languages have been customized to perform control sequencing. Hewlett Packard's Functional Test Manager (FTM) is an example of a system that provides a spread sheet-like test form for specifying the procedure, limits, and next actions to be taken by tests written in a conventional textual language. Systems of this type, however, do not allow the programmer to make use of the flexibility of graphical programming to specify the individual tests or control over sequencing actions, such as is available in an Iconic Programming Environment.

There is a need in the art then for a system that combines conventional test sequence control in an iconic programming environment. The present invention meets this and other needs.

Various features and components of an iconic network system are disclosed in U.S. patent applications:

(A) Application Ser. No. 07/483,478 filed Feb. 22, 1990 for PROGRAMMING ESCAPE FROM AN ICONIC SYSTEM of Bailey, Beethe, Wolber, and Williams, now abandoned;

(B) application Ser. No. 07/537,550 filed Jun. 13, 1990 for PROCESSING METHOD FOR AN ICONIC PROGRAMMING SYSTEM of Beethe, now U.S. Pat. No. 5,313,574; 5,313,575;

(C) Application Ser. No. 07/661,936 filed Feb. 28, 1991 for LINE PROBE IN AN ICONIC PROGRAMMING SYSTEM of Wolber, now U.S. Pat. No. 5,377,318;

(D) Application Ser. No. 07/668,286 filed Mar. 12, 1991 for INPUT AND OUTPUT CONSTRAINTS ON DEVICES IN AN ICONIC PROGRAMMING SYSTEM of Wolber and Beethe, now U.S. Pat. No. 5,261,043;

(E) Application Ser. No. 07/668,285 filed Mar. 12, 1991 for A SYSTEM FOR ENTERING AND MODIFYING VARIABLE NAMES FOR TERMINALS OF ICONS IN AN ICONIC PROGRAMMING SYSTEM of Wolber and Beethe, now U.S. Pat. No. 5,293,476; and (F) Application Ser. No. 07/686,861 filed Apr. 12, 1991 for WAIT FOR SERVICE REQUEST IN AN ICONIC PROGRAMMING SYSTEM of Beethe;

each of which is hereby specifically incorporated by reference for all that is disclosed and taught therein.

SUMMARY OF THE INVENTION

It is an aspect of the present invention to provide a system that provides a means for including a sequencer within an iconic programming system.

It is another aspect to provide such a means in the form of an iconic device.

The above and other aspects of the invention are accomplished in an iconic programming system that provides a sequencer icon to allow a series of operations to be defined and performed. Each operation performed, called a transaction, can be enabled or disabled, or can be enabled or disabled by a function within the process, for example it might be enabled by a random function to cause it to perform a certain percentage of the time. The results of each transaction can be compared to tolerance limits and different subsequent transactions processed based upon whether the transaction results fell within the tolerance limits. The output of each transaction can be logged into a buffer to keep the results for later analysis.

Each transaction is typically a test of a device, such as in a manufacturing environment. Each transaction, or test, to be performed is described on a single line within the sequencer icon, along with the test's limits, enabling condition, logging control, test cleanup control and logic to determine which test should be performed next.

BRIEF DESCRIPTION OF THE DRAWINGS

The above and other aspects, features, and advantages of the invention will be better understood by reading the following more particular description of the invention, presented in conjunction with the following drawings, wherein:

FIG. 8 shows a diagram of the results of logging several tests.

DESCRIPTION OF THE PREFERRED EMBODIMENT

The following description is of the best presently contemplated mode of carrying-out the present invention. This description is not to be taken in a limiting sense but is made merely for the purpose of describing the general principles of the invention. The scope of the invention should be determined by referencing the appended claims.

Figure 1:
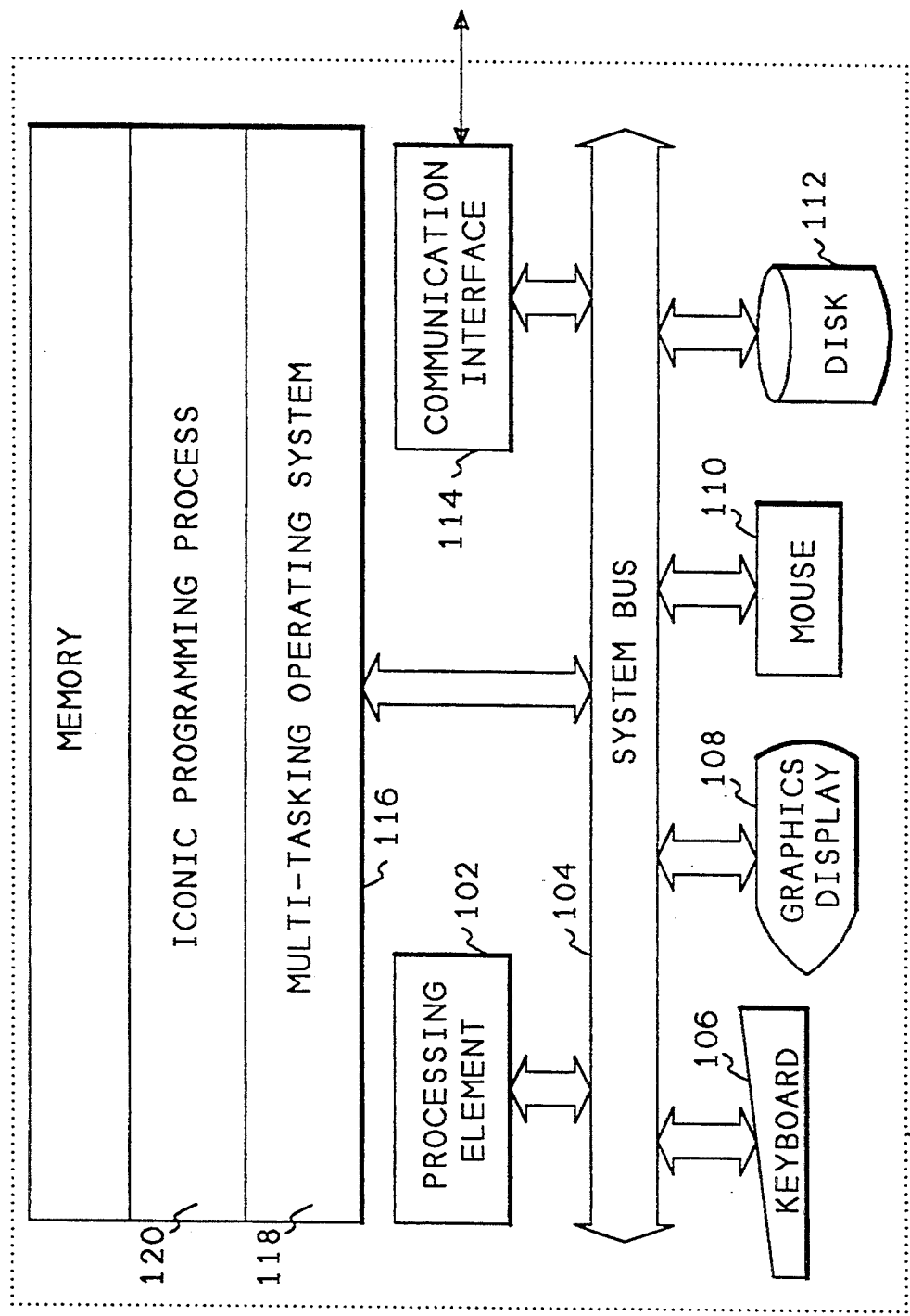
FIG. 1 shows a block diagram of a computer system containing the iconic programming process of the present invention.

FIG. 1 shows a block diagram of a computer system incorporating the present invention. Referring now to FIG. 1, a computer system 100 contains a processing element 102 which connects to the other components of the system through a system bus 104. A keyboard 106 allows a user to input textual data to the system, and a mouse 110 allows a user to input graphical data to the system. A graphics display 108 allows the system to output text and graphical information to the user. A disk 112 is used by the system to store the software of the iconic programming system environment, as well as the user-defined iconic network including the transactions defined within each sequencer icon. A communications interface 114 is used to create a communications network which allows the computer and iconic programming environment to communicate with other computers and other environments. Memory 116 is used to contain the software and user data of the iconic programming environment. A multi-tasking operating system 118 can have a plurality of tasks, also called processes, and the iconic programming process 120, of the presenting invention, executes in one of the tasks of the multi-tasking operating system 118.

Figure 2:
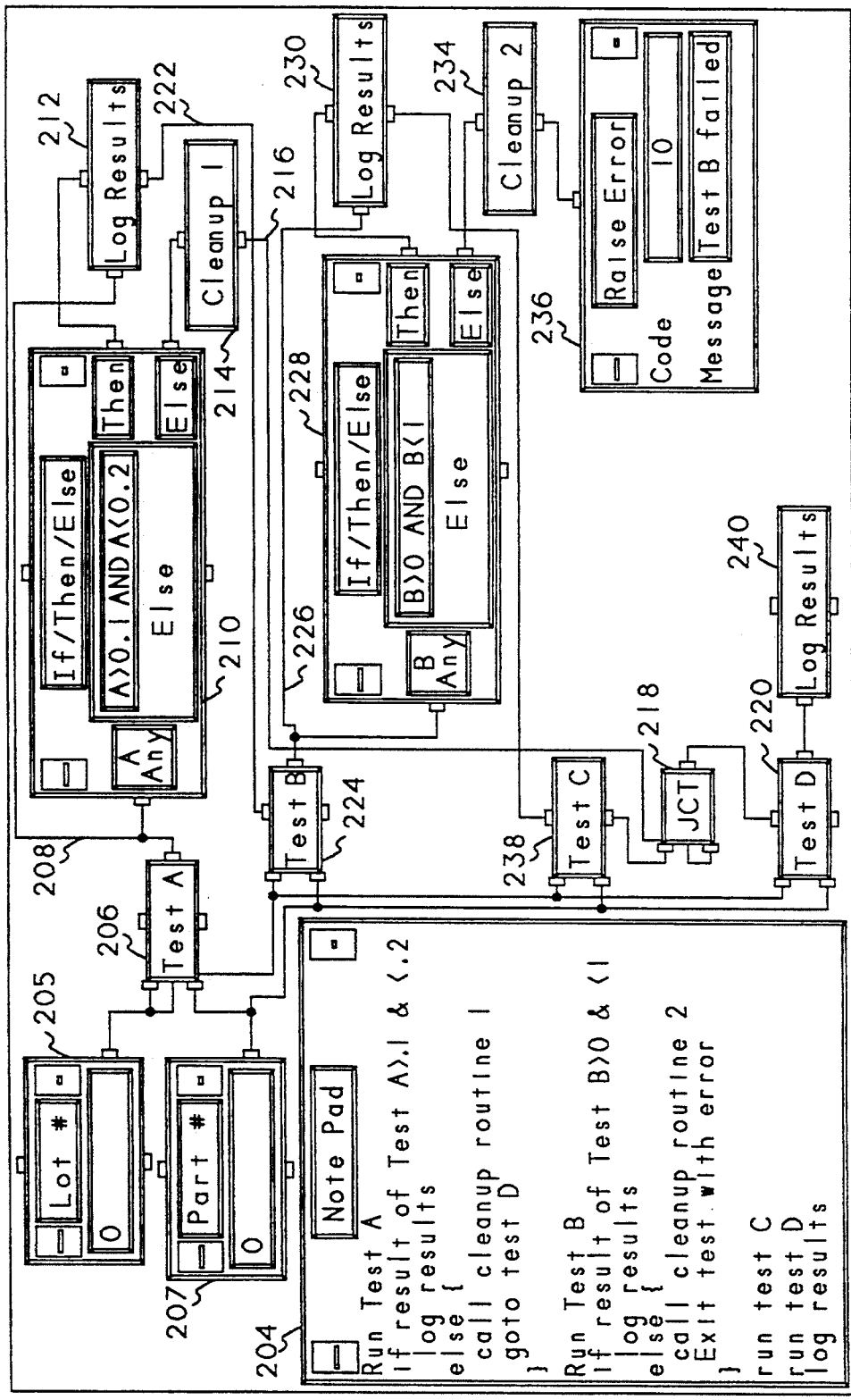
FIG. 2 shows a prior art method of sequencing tests.

FIG. 2 shows a prior art method of sequencing tests within an iconic program environment, such as the HP-VEE system manufactured by Hewlett Packard Company, Palo Alto, Calif. Referring now to FIG. 2, an iconic program, created by a user of the system, is displayed on a video display screen 202, such as the graphics display 108 of FIG. 1. A Note Pad 204 within the display 202 provides a comment for the program and gives an illustration of what the program is designed to accomplish, however, the text within the note pad 204 does not control the program in any way. When the program starts execution, a test "A" represented by icon 206, performs a testing function within the iconic programming system. The exact test performed by test "A" 206 is not important for illustration of the invention, however, any type of test on an electronic instrument might be performed, or the test could involve only data within the memory of the iconic system. When test "A" 206 completes, its output 208 is connected to the input of an If/Then/Else icon 210. The If/Then/Else icon 210 performs the testing indicated by lines 2-7 of the comment within the Note Pad 204. That is, the If/Then/Else icon 210 tests the output 208 of the test "A" 206 to determine whether the output is greater than 0.1 and also less than 0.2. If the results of test "A" 206 are within this range, a signal is sent to the Log Results icon 212 which causes the results 208 of the test "A" 206 to be logged in into a data area within the system. If the results 208 of test "A" are not within the range specified, a signal is sent to the Cleanup icon 214 which performs a cleanup function, such as placing the device being tested into a known state after the failure of test "A. After Cleanup icon 214 performs its function, a signal is sent through the bottom pin of the Cleanup icon 214 along line 216 through a junction icon 218 to the input of test "D" 220 to cause test "D" to be performed, as illustrated in line 6 of the comment within the Note Pad 204.

If test "A" is successful and its output is within the specified range, the Log Results icon 212 is performed as described above, and then a signal is sent along signal 222 to test "B" icon 224 to cause test "B" to perform, as described in line 8 of the comment within the Note Pad 204. After test "B" completes, its output 226 is sent to a second If/Then/Else icon 228 which tests the results 226 from the test "B" 224, as described in lines 8-13 of the comment within Note Pad 204. If the result 226 from test "B" is greater than zero and less than 1, If/Then/Else icon 228 sends a signal to Log Results icon 230 which stores the result 226 from the test "B" 224. If test "B's" output is not within the specified range, a signal is sent from If/Then/Else icon 228 to Cleanup icon 234 which performs a cleanup function, such as placing the tested device into a known state after the failure of test "B", and then icon 236 displays an error message on the screen to the person running the test.

If test "B" was successful and Log Results icon 230 was called, after performing the logging, icon 230 will send a signal to test "C" icon 238 to perform another test. After test "C" 238 is complete, it will send a signal through Junction icon 218 to test "D" 220. Test "D" 220 is then performed and the results logged with Log Results icon 240.

Figure 3:
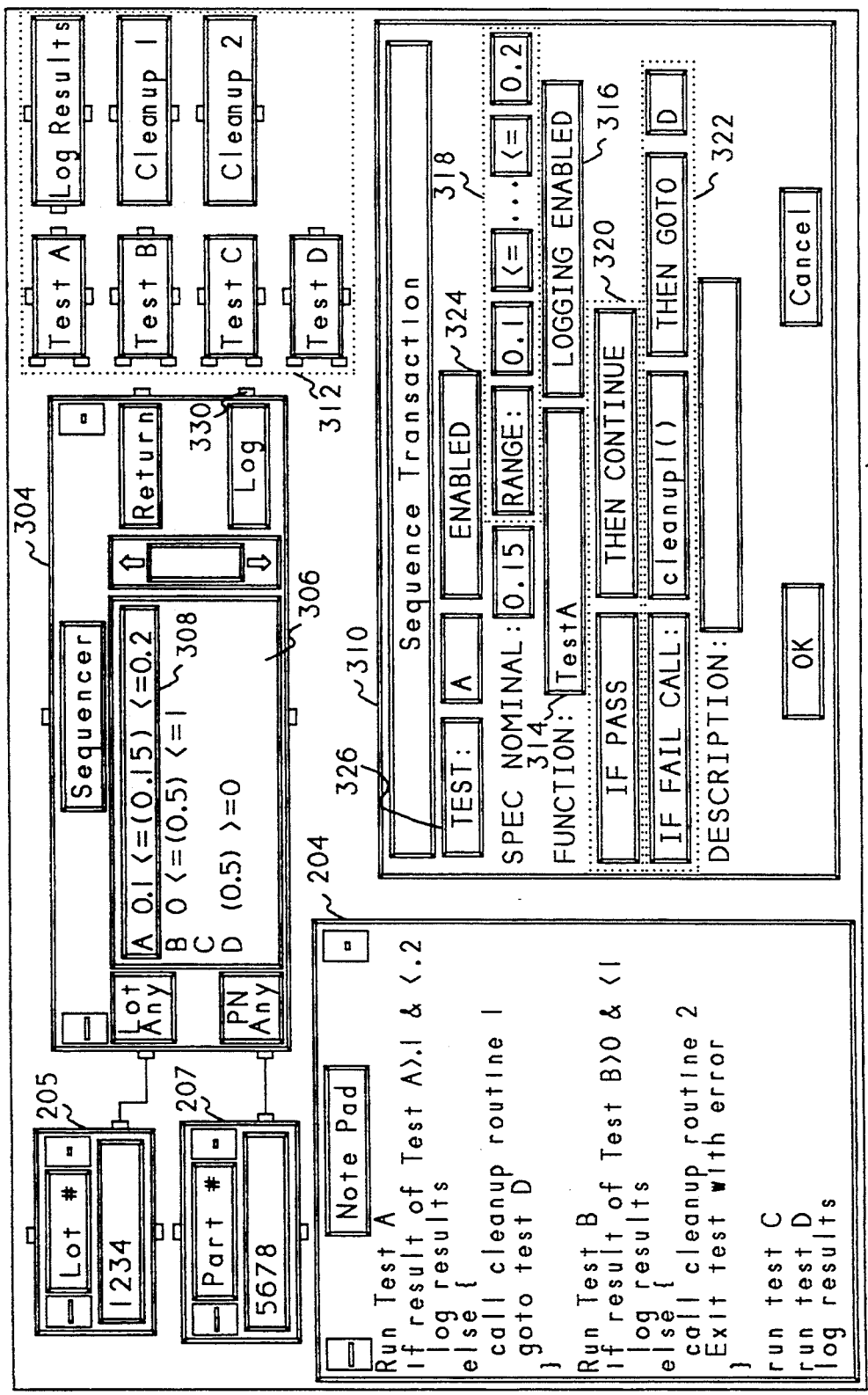
FIG. 3 shows the sequencer icon of the present invention being used to sequence a series of tests.

FIG. 3 shows the sequencer icon of the present invention being used to sequence a series of tests, the same series illustrated above with respect to FIG. 2. Referring now to FIG. 3, the screen output 302 is shown having the Note Pad 204 identical to the Note Pad 204 of FIG. 2. As in FIG. 2, this Note Pad is only a comment and does not direct the functioning of the iconic system. Within the screen 302, a sequencer icon 304, of the present invention, contains a window 306 which lists each of the tests that are to be performed. Each of these tests and other routines that run as a result of the test are shown in the dashed area 312, however, the test shown within dashed area 312 are for illustrative purposes only, and are not normally shown on the screen when the tests are being performed.

Sequencer icon 304 replaces icons 210, 218, 228 and 236 of FIG. 2 as well as all the connecting lines between the icons of FIG. 2, except for the connecting lines leading from icons 205 and 207.

Within the window 306, test "A" 308 is highlighted and the parameters for running this test are shown expanded in window 310. During processing of the sequencer within the iconic system, window 310 is not visible. Window 310 is used for examining or editing the parameters of any sequencer transaction before processing.

Within the window 310, a function button 314 shows that the actual name for the test is "Test A". A Logging Enabled button 316 shows that logging will be performed in the same manner as the Log Results icon 212 (FIG. 2). Dotted line 318 illustrates the range that will be allowed for the output of test "A" which is the same range as illustrated in FIG. 2 within the If/Then/Else icon 210. Dotted line 320 illustrates that if the test passes, sequencing will continue to the next line within the window 306, which will run test "B". Dotted line 322 shows that if the test fails "Cleanup1" routine will be called and then sequencing will go to test "D" in the same manner sequencing occurred within FIG. 2.

Figure 4:
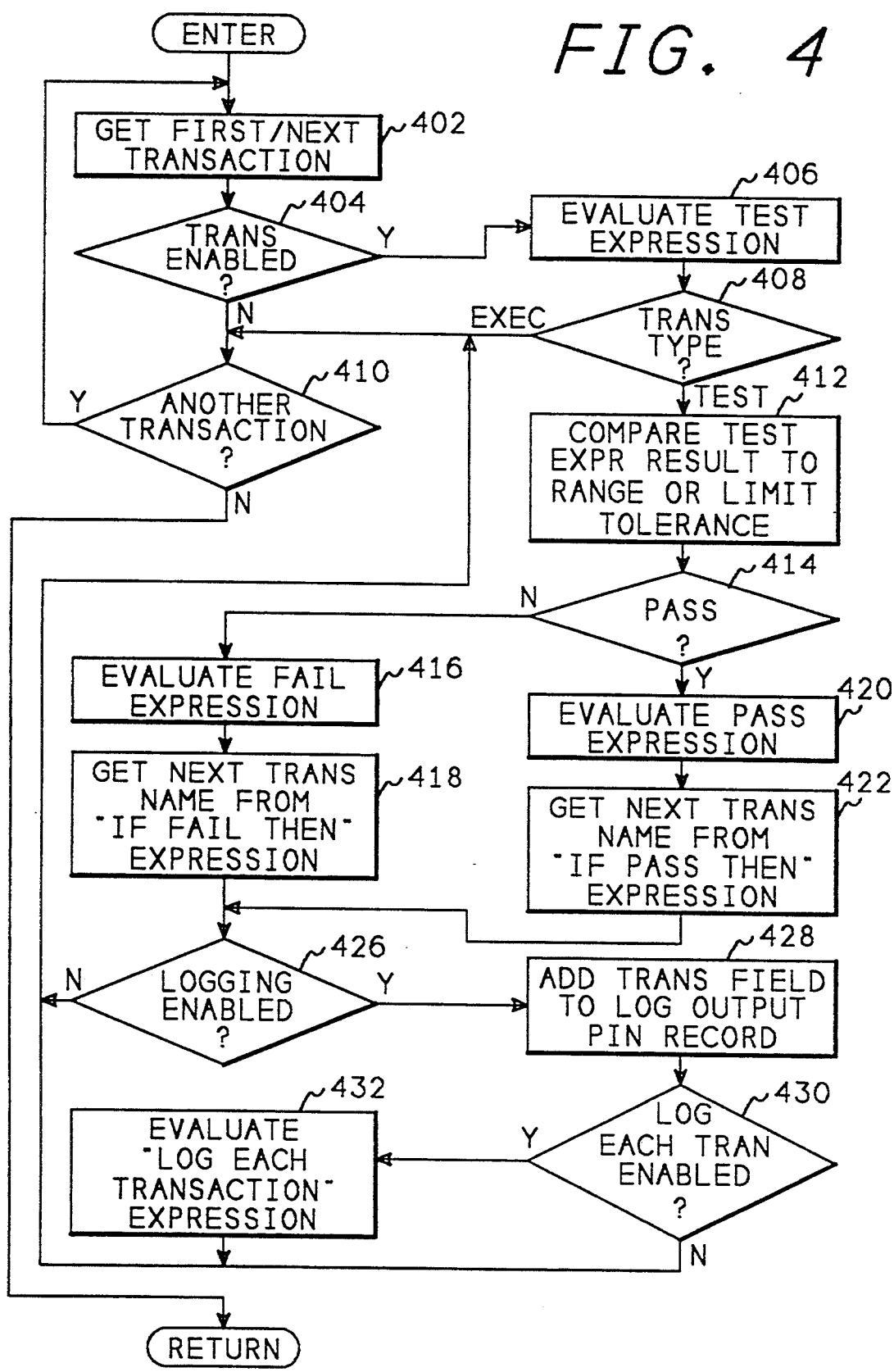
FIG. 4 shows a flowchart of the process of the sequencer icon within the iconic programming environment.

FIG. 4 shows a flowchart of the program code necessary to perform the functions of the sequencer icon 304. The process for performing the sequencer will be called from the iconic programming process 120 in the manner described above with respect to application Ser. No. 07/537,550 for PROCESSING METHOD FOR AN ICONIC PROGRAMMING SYSTEM, now U.S. Pat. Nos. 5,313,574; 5,313,575.

Referring now to FIG. 4, after the process of FIG. 4 is called to process a sequencer icon, control enters at block 402 which gets the first or next transaction within the sequencer, such as, for example, transaction 308 illustrated above with respect to FIG. 3. Block 404 then determines whether the transaction is enabled, as shown in FIG. 3 with respect to Enabled button 324. If the transaction is not enabled, block 404 transfers to block 410 which determines whether there are additional transactions within the sequencer icon and if there are, block 410 transfers back to block 402 to get the next transaction. After all transactions have been processed, block 410 returns to its caller.

If the transaction is enabled, block 404 transfers to block 406 which evaluates the test expression, by either transferring to an icon to perform the function defined, such as the name of a function illustrated in FIG. 3 with function field 314. Other, conventional, programming functions may also be performed within the iconic programming environment through the test expression. After performing the function, block 406 transfers to block 408 which determines whether the transaction type, defined by button 326 in FIG. 3, is a test or execute transaction. If the transaction is an execute transaction (illustrated below with respect to FIG. 6), block 408 transfers to block 410 since no testing is required for an execute transaction. If the transaction type is a test type transaction, however, block 408 transfers to block 412 which compares the results of performing the test expression to the range or limit tolerance, such as illustrated above in FIG. 3 with respect to the ranges shown in dotted line 318. Block 414 then determines whether the results are within the range or limit tolerance, which passes the test, and if the test passes, block 414 transfers to block 420 which evaluates the pass expression, such as the expression illustrated by dotted line 320 in FIG. 3. Block 422 then gets the next transaction name from the "If Pass" block, which is the right most block within the dotted line 320 of FIG. 3. Control then goes to block 426.

If the test did not pass the range or limit tolerance, block 414 transfers to block 416 which evaluates the fail expression, such as the expression second from the left within dotted line 322 of FIG. 3. Block 418 then gets the next transaction name from the "If Fail" block, which are the right most two blocks within dotted line 322 of FIG. 3. Control then transfers to block 426. Block 426 determines whether logging has been enabled, for example, the Logging Enabled block 316 of FIG. 3. If logging is not enabled, block 426 transfers back to block 410 to process the next transaction. If logging is enabled, block 426 transfers to block 428 which adds logging information for the test expression to the log output pin of the sequencer block, such as output pin 330 in FIG. 3. Block 430 then determines whether the "log each transaction" box is enabled (this box is not illustrated above in FIG. 3), and if so, transfers to block 432 which evaluates the "log each transaction" expression for the transaction. In either case, control then returns to block 410 to process the next transaction.

Figure 5:
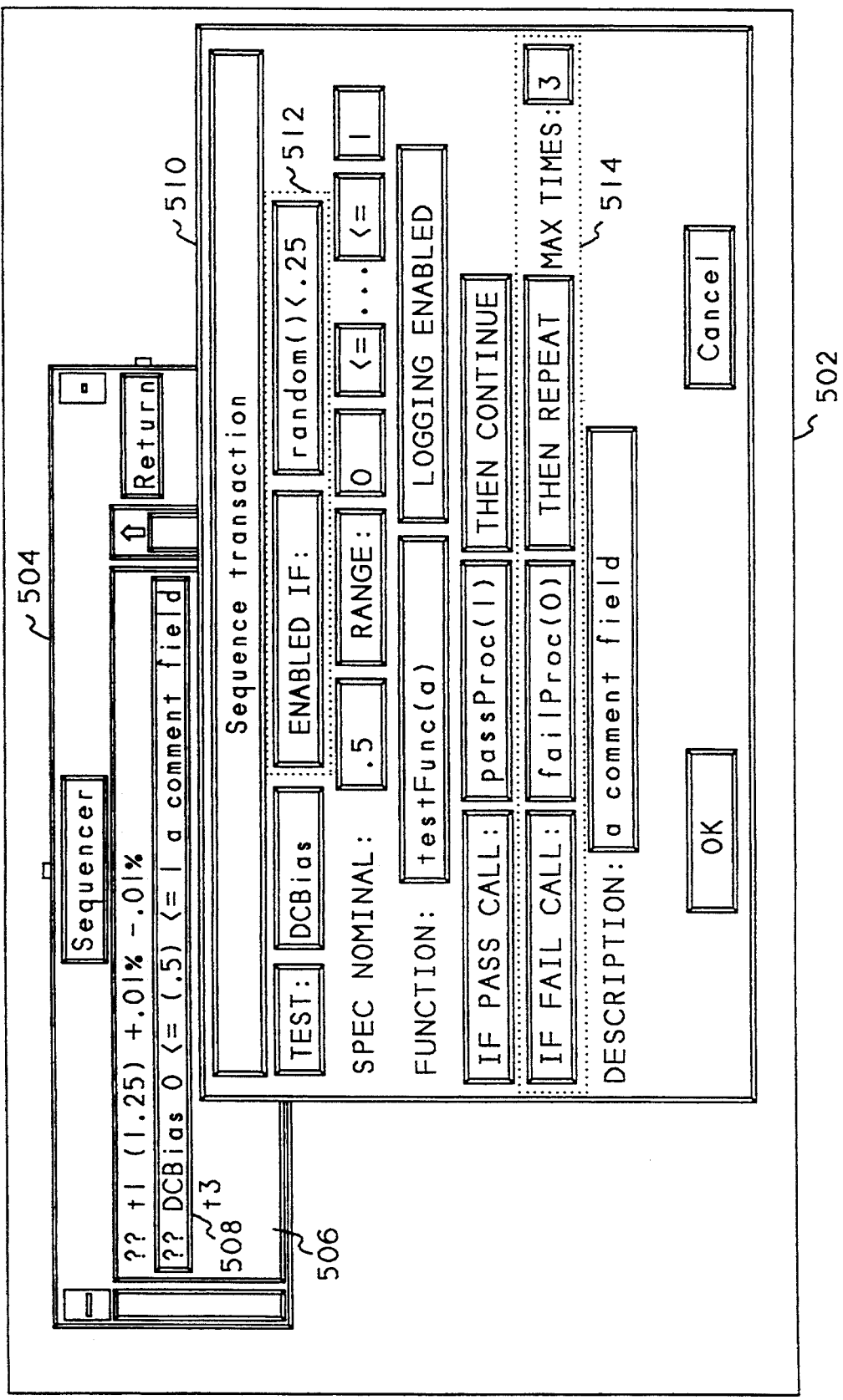
FIG. 5 shows the sequencer icon and illustrates the enabling capability for each test being sequenced.

FIG. 5 shows a sequencer icon and illustrates the enabling capability for each test being sequenced. Referring now to FIG. 5, an output screen 502 is shown having a sequencer icon 504. Within the sequencer icon 504, several sequence transactions are shown within a window 506. One of these transactions, transaction 508, is highlighted and illustrated within the sequence transaction window 510.

Within the sequence transaction window 510, dotted line 512 illustrates another way the transaction can be enabled. That is, the transaction can be enabled based on the results returned from a function. For example, within the dotted line 512, a random number function is called and if the result of the random number function is less than 0.25, the test will be enabled. This might be used, for example, to run the test 25% of the time, since the result of the random number function will be a value evenly spread between zero and one, thus, less than 0.25 would cause the test to be enabled approximately 25% of the time. Also, the function results need not be compared to a value if the functions returns a value of either true or false. In this case, the sequence transaction will be enabled if the function returns true, and disabled if the function returns false.

In addition to being enabled by the results returned by a function, the sequence transaction can be disabled by the results returned by a function. The "ENABLED IF" button within dotted line 512 can be changed to a "DISABLED IF" which causes the sequence transaction to be disabled if the function returns a value of true.

Another capability for sequence transactions, is shown by the dotted line 514, which illustrates that if the test fails, it can be repeated a number of times.

Figure 6:
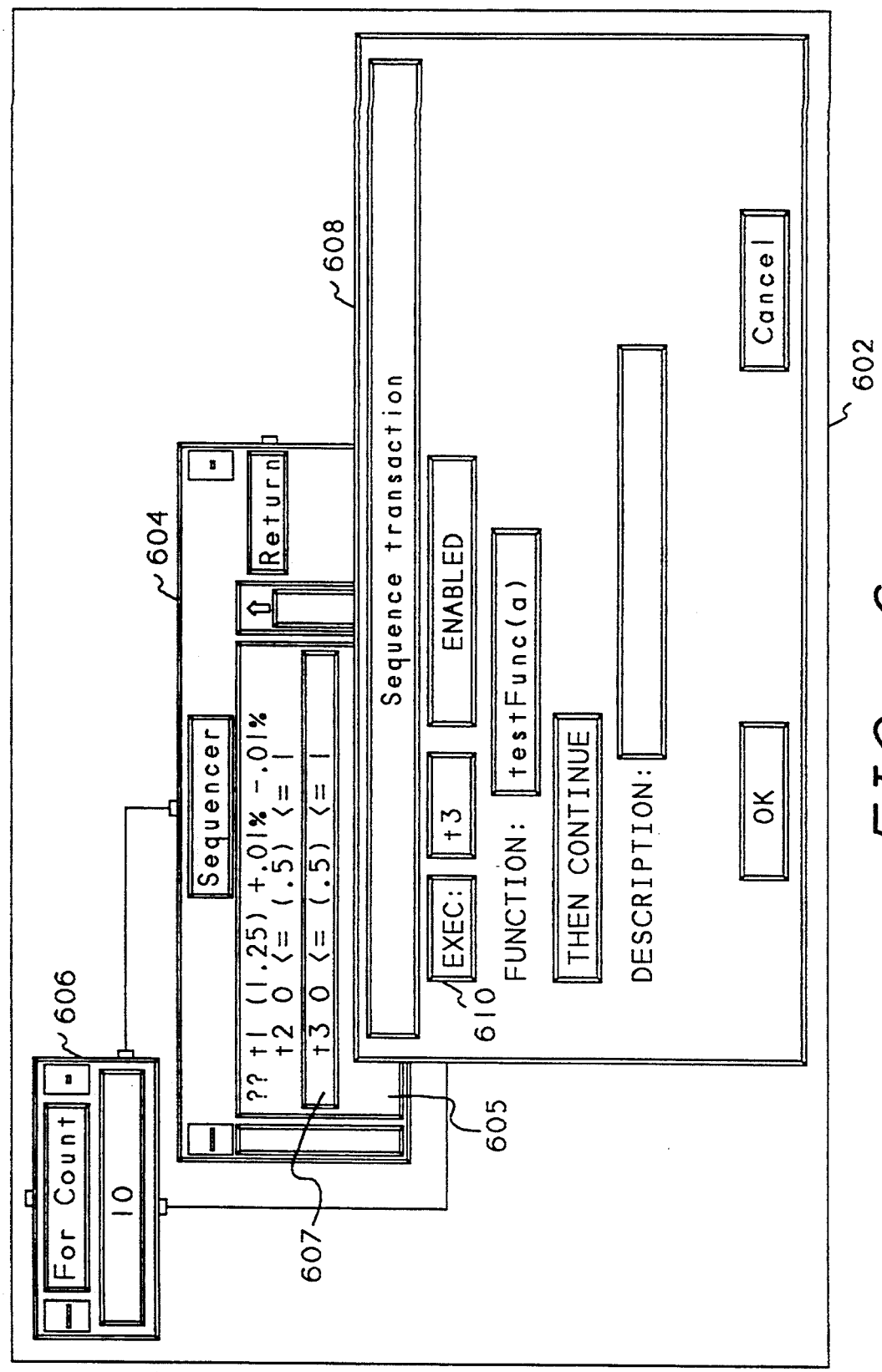
FIG. 6 shows the sequencer icon and illustrates the always execute capability for each test being sequenced.

FIG. 6 shows a sequencer icon and illustrates the always execute only capability for a test being sequenced. This capability would be used for tests "C" and "D" of FIGS. 2 and 3. Referring now to FIG. 6, an output screen 602 shows a sequencer icon 604 having a number of sequence transactions illustrated within the window 605. One of the sequence transactions, transaction 607, is highlighted and better shown within the sequence transaction window 608. This transaction has a transaction type of execute, shown by transaction type button 610. This transaction type does not perform range or limit tolerance testing, and never produces a logging record.

FIG. 6 also illustrates that a sequencer icon can be performed in the same manner as any other icon within the iconic programming environment. For example, count icon 606 will cause the sequencer icon 604 to be performed ten times, thus the entire set of sequence transactions defined within the sequencer icon 604 will be performed a total of ten times.

Figure 7:
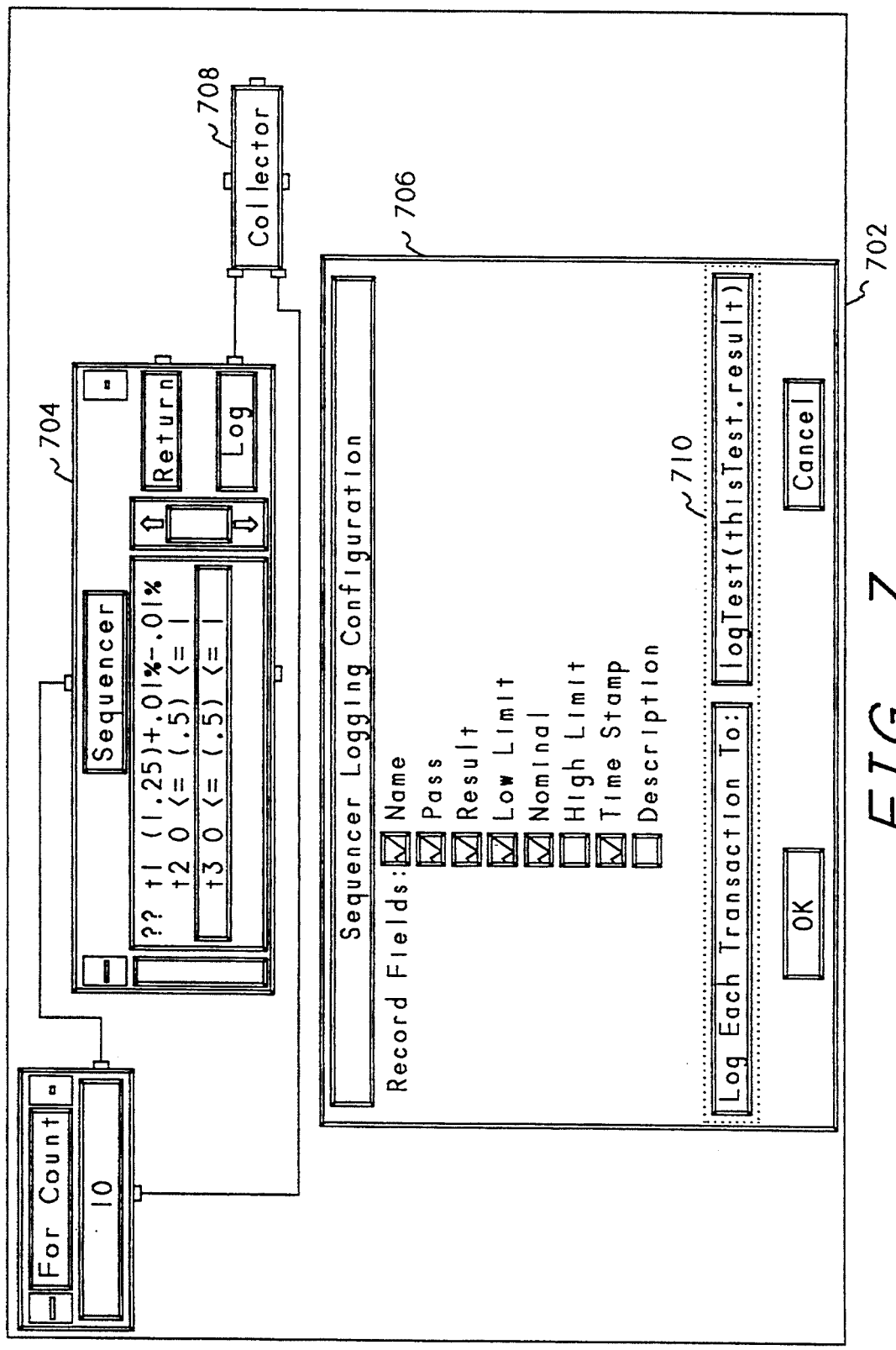
FIG. 7 shows the sequencer icon with logging being used.

FIG. 7 shows the sequencer icon with logging being used. Referring now to FIG. 7, a screen 702 contains a sequencer icon 704. A window 706 shows the sequencer logging configuration and indicates which type of information will be sent to the collector icon 708 from the logging information collected by the sequencer 704. The window 706 indicates that the name field, pass field, result field, low limit, nominal, high limit, time stamp, and description can be logged. Only the name field, pass field, result field, low limit, nominal and time stamp fields have been selected. Dotted line 710 surrounds two buttons which indicate that logging will be logged to the specified expression, which is shown as a call to function logtest with this test's result value as a parameter.

Figure 8:
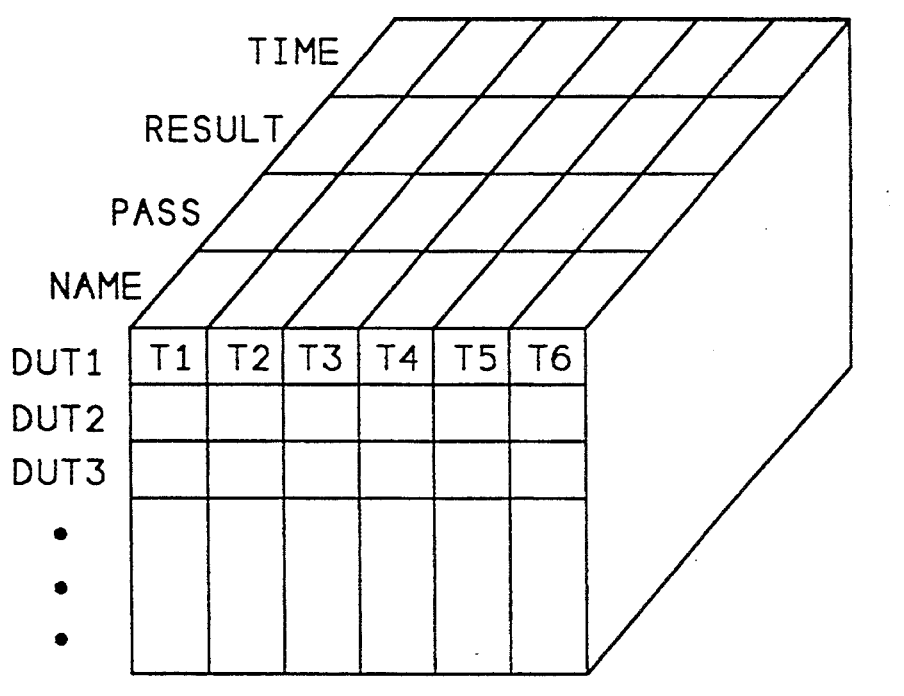

FIG. 8 shows a diagram of the results of logging several tests. This diagram shows that data from multiple passes through a sequencer can cause logging information to be stored as a three dimensional structure, which is made available on an output pin of the sequencer (e.g. available to the collector 708 of FIG. 7). Referring now to FIG. 8, the horizontal (X) dimension of the structure identifies which test was being performed, such as, for example, T1, T2, through T6. The vertical (Y) dimension of the structure indicates the device under test (DUT), such as, for example, DUT1, DUT2, DUT3, etc., where data for each DUT is generated by one execution of the sequencer. The Z dimension of the structure indicates which of the fields is stored for each test within each device under test, such as was indicated in FIG. 7 by window 706. In FIG. 8, the name, pass/fail indicator, result, and time information is stored for each test run for each device under test. By storing information in this manner, the iconic programming process allows a user to perform statistical measurements over several devices and several tests to determine trends.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In an iconic programming system process executing in a computer system, a computer executed method for performing a list of transactions within one icon of said iconic programming system process, said computer executed method comprising the steps of:
 (a) displaying a sequencer icon having said list of transactions wherein each transaction in said list identifies a tolerance limit, a test expression, a pass transaction identifier of a transaction contained within said list, and a fail transaction identifier of a transaction contained within said list, wherein said test expression is either a call to an iconic procedure, a call to a conventional programming process, a mathematical equation, or a variable containing data logged by a previously performed transaction;
 (b) assigning a top transaction of said list as a current transaction;
 (c) performing a test expression of said current transaction;
 (d) comparing a result of said test expression of said current transaction to said tolerance limit identified in said current transaction;
 (e) when said result is within said tolerance limit, assigning a transaction identified by said pass transaction identifier to said current transaction; and
 (f) when said result is outside said tolerance limit, assigning a transaction identified by said fail transaction identifier to said current transaction; and
 (g) repeating steps (c) through (f) until said list is exhausted.

2. The process of claim 1 wherein each transaction in said list further comprises a logging flag, and wherein step (c) further comprises the steps of:
 (c1) when said logging flag defines that logging is requested, after performing said test expression, storing said result in a logging data area.

3. The process of claim 2 wherein said storing comprises the step of calling a function within said iconic programming system process to perform said storing.

4. The process of claim 1 wherein each transaction in said list further comprises an enable condition, and wherein step (c) further comprises the step of:
 (c2) when said enable condition is not met, assigning a next transaction following said current transaction in said list as said current transaction before performing said test expression.

5. The process of claim 4 wherein step (c2) further comprises the step of:
 (c2a) evaluating an expression within said iconic programming system process, and defining said enable condition as met when said expression evaluation results in a value of true, wherein said expression is either a call to an iconic procedure, a call to a conventional programming process, a mathematical equation, or a variable containing data logged by a previously performed transaction.

6. The process of claim 1 wherein each transaction in said list further comprises a disable condition, and wherein step (c) further comprises the step of:
 (c2) when said disable condition is met, assigning a next transaction following said current transaction in said list as said current transaction before performing said test expression.

7. The process of claim 6 wherein step (c2) further comprises the step of:
 (c2a) evaluating an expression within said iconic programming system process, and defining said disable condition as met when said expression evaluation results in a value of true, wherein said expression is either a call to an iconic procedure, a call to a conventional programming process, a mathematical equation, or a variable containing data logged by a previously performed transaction.

8. The process of claim 1 wherein each transaction in said list further comprises a repeat count for said fail transaction identifier, and wherein step (f) further comprises the step of:
 (f2) incrementing a fail count;
 (f3) when said fail count is less than or equal to said repeat count, repeating steps (c) through (f); and
 (f4) when said fail count is greater than said repeat count, assigning a transaction identified by said fail transaction identifier to said current transaction.

9. The process of claim 1 wherein step (e) further comprises the step of:
 (e1) when said pass transaction identifier contains no transaction identifier, assigning a next transaction following said current transaction in said list as said current transaction.

10. The process of claim 1 wherein step (f) further comprises the step of:
 (f1) when said fail transaction identifier contains no transaction identifier, assigning a next transaction following said current transaction in said list as said current transaction.

11. In an iconic programming system process executing in a computer system, a computer executed method for performing a list of transactions within one icon of said iconic programming system process, said computer executed method comprising the steps of:
 (a) displaying a sequencer icon having said list of transactions wherein each transaction in said list comprises an enable condition, a test expression, a tolerance limit, a pass transaction identifier that identifies a transaction contained within said list, and a fail transaction identifier that identifies a transaction contained within said list, wherein said test expression is either a call to an iconic procedure, a call to a conventional programming process, a mathematical equation, or a variable containing data logged by a previously performed transaction;
 (b) assigning a top transaction of said list as a current transaction;
 (c) when said enable condition is not met, assigning a next transaction following said current transaction in said list as said current transaction and repeating step (c).
 (d) performing a test expression of said current transaction;
 (e) comparing a result of said test expression to said tolerance limit identified for said current transaction;
 (f) when said result is within said tolerance limit, assigning a transaction identified by said pass transaction identifier to said current transaction; and
 (g) when said result is outside said tolerance limit, assigning a transaction identified by said fail transaction identifier to said current transaction; and
 (h) repeating steps (c) through (g) until said list is exhausted.

12. The process of claim 11 wherein each transaction in said list further comprises a logging flag, and wherein step (d) further comprises the steps of:
 (d1) when said logging flag defines that logging is requested, after performing said test expression, storing said result in a logging data area.

13. The process of claim 12 wherein said storing comprises the step of calling a function within said iconic programming system process to perform said storing.

14. The process of claim 11 wherein step (c) further comprises the step of:
 (c1) evaluating an expression within said iconic programming system process, and defining said enable condition as met when said expression evaluation results in a value of true, wherein said expression is either a call to an iconic procedure, a call to a conventional programming process, a mathematical equation, or a variable containing data logged by a previously performed transaction.

15. The process of claim 11 wherein each transaction in said list further comprises a repeat count for said fail transaction identifier, and wherein step (g) further comprises the step of:
 (g2) incrementing a fail count;
 (g3) when said fail count is less than or equal to said repeat count, repeating steps (c) through (f); and
 (g4) when said fail count is greater than said repeat count, assigning a transaction identified by said fail transaction identifier to said current transaction.

16. The process of claim 11 wherein step (f) further comprises the step of:
 (f1) when said pass transaction identifier contains no transaction identifier, assigning a next transaction following said current transaction in said list as said current transaction.

17. The process of claim 11 wherein step (g) further comprises the step of:
 (g1) when said fail transaction identifier contains no transaction identifier, assigning a next transaction following said current transaction in said list as said current transaction.

* * * * *